United States Patent [19]

Poole

[11] 4,128,408
[45] Dec. 5, 1978

[54] AIR FILTER FOR MOTOR VEHICLE CARBURETOR

[76] Inventor: Walter D. Poole, 10922-117 St., Edmonton, Alberta, Canada

[21] Appl. No.: 794,856

[22] Filed: May 9, 1977

[51] Int. Cl.² .......................................... B01D 46/00
[52] U.S. Cl. .................................... 55/498; 55/509; 210/232; 210/497 R
[58] Field of Search .................. 55/498, 500, 507, 509, 55/510; 210/232, 497, 495, 315

[56] References Cited

U.S. PATENT DOCUMENTS

| | | | |
|---|---|---|---|
| 2,555,742 | 6/1951 | Grue | 55/507 |
| 3,208,202 | 9/1965 | Herubel | 55/498 |
| 3,290,870 | 12/1966 | Jensen | 55/498 |
| 3,406,502 | 10/1968 | Wiik | 55/378 |
| 3,633,757 | 1/1972 | Madern | 55/498 |

FOREIGN PATENT DOCUMENTS 1387618  12/1964  France ........................................ 55/500

*Primary Examiner*—Bernard Nozick
*Attorney, Agent, or Firm*—Robert F. Delbridge; Arne I. Fors

[57] ABSTRACT

An air filter for a motor vehicle carburetor includes a filter body having a pair of rings spaced apart in an axial direction by spacers which occupy a relatively small proportion of the space between the rings. An annular filter cloth surrounds the space between the rings and has edges overlapping the radially outer edges of the rings in a radially inward direction to retain the filter cloth thereon. The edges of the filter cloth are resilient to enable the filter cloth to be readily assembled with and removed from the filter body, and the filter cloth having a weave which prevents passage of undesirable solid matter therethrough without unduly restricting air flow.

4 Claims, 3 Drawing Figures

AIR FILTER FOR MOTOR VEHICLE CARBURETOR

This invention relates to air filters for motor vehicle carburetors.

Virtually every vehicle carburetor has a filtered air inlet. It is well known that filters for this purpose have to be effective in filtering out solid material in the atmosphere which may cause the carburetor to malfunction or which may get into a cylinder and damage the cylinder wall, piston or piston rings. At the same time, the filter must not unduly obstruct the flow of air to the carburetor, since this would adversely affect the performance of the motor of the vehicle. Consequently, it is necessary to replace such filters at regular intervals, before they become so clogged with solid material that passage of air through the filter is impaired to a significant extent.

Filters commonly used for this purpose have an annular or ring-like configuration, with an annular perforated metal body containing filter material, the arrangement being that air flows radially inwardly through the filter as it passes from the atmosphere to the carburetor. Filters of this kind have been used for many years but, owing to their construction, the cost of replacing such filters is not insignificant, particularly since inflation continues to cause the cost of such items to increase frequently. Also, the whole filter has to be thrown away with consequent loss of material, since it is not practicable to recycle any parts of such known filters.

It would therefore be advantageous if a filter could be provided which is relatively inexpensive compared to the commonly used type of filter, and yet which adequately filters out undesirable solid material without unduly restricting the air flow.

According to the present invention, an air filter for a motor vehicle carburetor includes a filter body comprising a pair of rings spaced apart in an axial direction by spacing means which occupy only a relatively small poroportion of the space between the rings, and an annular filter cloth surrounding the space between the rings and having edges overlapping the radially outer edges of the rings in a radially inward direction to retain the filter cloth thereon, the edges of the filter cloth being resilient to enable the filter cloth to be readily assembled with and removed from the filter body, and the filter cloth having a weave prevents passage of undesirable solid matter therethrough without unduly restricting air flow.

An air filter in accordance with the present invention is relatively inexpensive. Further, when the filter cloth has to be changed, it is not necessary to install a completely new filter as is the case with prior art filters, since it is merely necessary to remove the old filter cloth from the filter body and replace it with a new filter cloth. The filter body can be used for the life of the vehicle. It will be readily understood that the cost of a new filter cloth would be very much smaller than the cost of a new filter of the kind in common use. Also, it may be possible to wash and re-use some filter cloths a number of times.

The filter body may be made of a synthetic plastic material. The spacing means may be a series of circumferentially spaced struts, and the struts may have radially oriented flat sides. The rings may conveniently have flat axially opposed surfaces.

Advantageously, the filter cloth may have foldedover edges forming pockets which each contains a length of elastic material to render the edges resilient.

One embodiment of the present invention will now be described by way of example, with reference to the accompanying drawings, in which.

Figure 1:
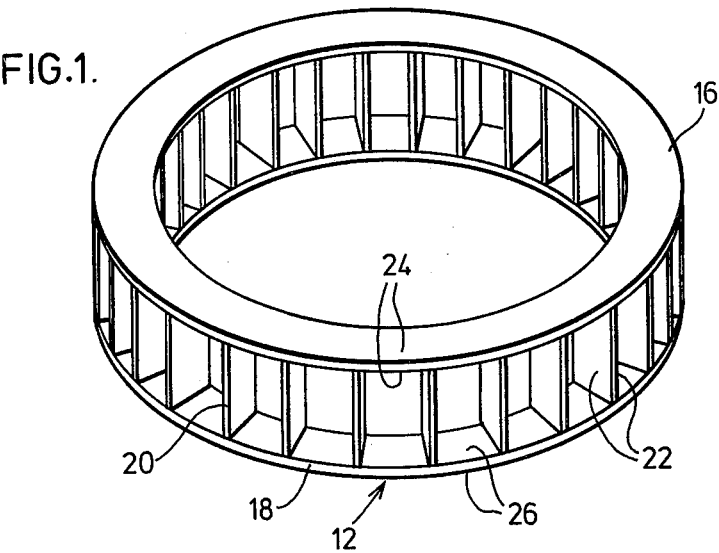
FIG. 1 is a perspective view of a filter body.
Figure 2:
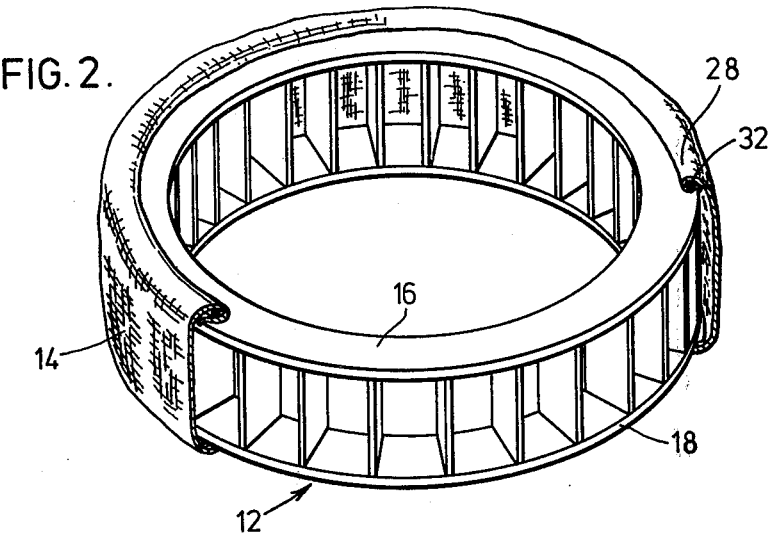
FIG. 2 is a similar view of the filter body with a filter cloth assembled therewith.
Figure 3:
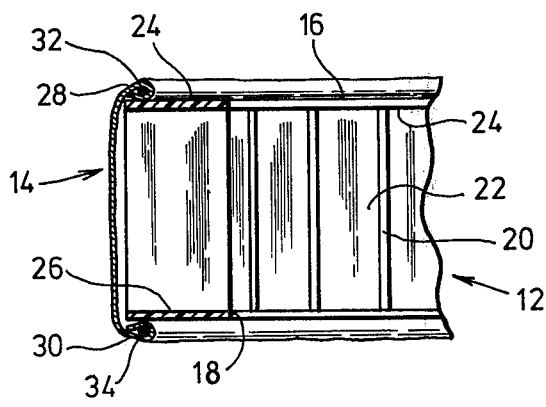
FIG. 3 is a sectional view taken along the line 3—3 of FIG. 2.

Referring to the accompanying drawing, a filter for an automobile carburetor comprises a filter body 12 and a filter cloth 14. The filter body 12 is made of synthetic plastic material, and includes a pair of rings 16, 18 spaced apart in an axial direction by spacers 20, which are themselves spaced apart in a circumferential direction. Spacers 20 have radially oriented flat sides 22 and are of small thickness so that they obstruct only a small proportion of the space between the rings 16, 18. Each ring 16, 18 has flat axially opposed surfaces 24, 26, respectively.

The filter cloth 14 has an annular configuration with folded-over edges 28, 30 forming pockets which contain lengths of elastic material 32, 34, respectively, to render the filter cloth edges 28, 30 resilient. The filter cloth 14 surrounds the space between the filter body ring 16, 18, and the respective filter cloth edges 28, 30 overlap the radially outer edges of the filter body rings 16, 18 in a radially inward direction to retain the filter cloth 14 on the filter body 12. Owing to the resilient nature of the filter cloth edges 28, 30, the filter cloth 14 can be easily assembled with or removed from the filter body 12.

The filter cloth 14 has a weave which prevents passage of undesirable solid matter therethrough without unduly restricting air flow. A person skilled in the art will readily be able to determine the suitability of a filter cloth for this purpose. In one particular example, one material used was flannelette with a fabric weight of 3.95 oz/sq.yd., a warp with 48 ends per inch and a weft of 39 picks per inch.

Similarly, in one particular example, the filter body 14 had rings 16, 18 with an outside diameter of 32 cm and an inside diameter of 28 cm, with the rings being axially spaced apart by 7 cm. The spacers 20 were approximately 4 cm apart from one another.

The relatively small cost of obtaining a filter or replacing a filter cloth in accordance with the present invention will be readily apparent from the foregoing description. Other embodiments will occur to a person skilled in the art without departing from the scope of the invention, which is defined in the appended claims.

What I claim as new and desire to protect by Letters Patent of the United States is:

1. An air filter for a motor vehicle carburetor including a filter body comprising a pair of rings spaced apart in an axial direction by spacing means between said rings and occupying a relatively small proportion of the space between the rings, said rings having flat axially opposed surfaces, and an annular filter cloth surrounding the space between the rings and having edges overlapping the radially outer edges of the rings in a radially inward direction to engage the outer flat surfaces of the rings and retain the filter cloth in assembly with the filter body, the edges of the filter cloth being resilient to enable the filter cloth to be readily assembled with and removed from the filter body, and the filter cloth having a weave which prevents passage of undesirable solid matter therethrough without unduly restricting air flow.

2. A filter according to claim 1 wherein the filter cloth has folded-over edges providing pockets, each pocket containing a length of elastic material to render the respective edge resilient, each resilient edge engaging the outer flat surface of the respective ring of the filter body.

3. An air filter according to claim 1 wherein the spacing means comprises a series of circumferentially spaced apart struts.

4. An air filter according to claim 3 wherein the struts have radially oriented flat sides.

* * * * *